United States Patent
McNaughton et al.

(10) Patent No.: US 10,525,381 B2
(45) Date of Patent: Jan. 7, 2020

(54) PURGING SYSTEM FOR DESANDING VESSELS

(71) Applicant: SPECIALIZED DESANDERS INC., Calgary (CA)

(72) Inventors: Brett McNaughton, Calgary (CA); Nathan Williams, Red Deer (CA)

(73) Assignee: SPECALIZED DESANDERS INC., Calgary (CA)

( * ) Notice: Subject to any disclaimer, the term of this patent is extended or adjusted under 35 U.S.C. 154(b) by 49 days.

(21) Appl. No.: 15/994,719

(22) Filed: May 31, 2018

(65) Prior Publication Data
US 2019/0366242 A1 Dec. 5, 2019

(51) Int. Cl.
| | | |
|---|---|---|
| *B01D 21/24* | (2006.01) | |
| *E21B 43/34* | (2006.01) | |
| *B01D 19/00* | (2006.01) | |
| *B01D 21/00* | (2006.01) | |
| *B01D 45/02* | (2006.01) | |

(52) U.S. Cl.
CPC ..... *B01D 21/2483* (2013.01); *B01D 19/0042* (2013.01); *B01D 21/0006* (2013.01); *B01D 21/2472* (2013.01); *E21B 43/34* (2013.01); *B01D 45/02* (2013.01)

(58) Field of Classification Search
CPC ............ B01D 19/0042; B01D 21/0006; B01D 21/2472; B01D 21/2483; B01D 45/02; E21B 43/34
USPC ....... 210/803, 523, 532.1, 539; 95/253, 260; 96/182, 183, 184; 166/75.12, 267
See application file for complete search history.

(56) References Cited

U.S. PATENT DOCUMENTS

| | | | | |
|---|---|---|---|---|
| 4,913,819 A | * | 4/1990 | Patterson | B01D 21/2466 210/523 |
| 6,021,787 A | * | 2/2000 | Luke | B01D 21/2472 134/22.1 |
| 7,785,400 B1 | * | 8/2010 | Worley | B01D 19/0042 96/182 |
| 8,025,806 B2 | * | 9/2011 | Lehman | B01D 21/0006 210/803 |
| 8,623,221 B1 | * | 1/2014 | Boyd | B01D 19/0042 166/267 |
| 8,945,256 B2 | * | 2/2015 | Hemstock | E21B 43/34 210/532.1 |
| 9,759,057 B2 | * | 9/2017 | Morin | E21B 43/34 |
| 2004/0074838 A1 | * | 4/2004 | Hemstock | E21B 43/34 210/513 |
| 2004/0222170 A1 | * | 11/2004 | Hauge | B01D 21/2472 210/803 |

(Continued)

*Primary Examiner* — Christopher Upton
(74) *Attorney, Agent, or Firm* — Parlee McLaws LLP (CGY); Sean Goodwin

(57) ABSTRACT

A system and method of cleaning a desanding vessel is provided including determining that sand has settled in the accumulation zone of the vessel, isolating and depressurizing the vessel and introducing a flush or wash fluid into the vessel. The wash fluid is introduced via a flush inlet at or near the process gas outlet of the vessel, and at a purge rate to fluidize sand in the accumulation zone and form a slurry. The slurry is collected from the vessel at a flush outlet downstream from the flush inlet. The purge rate is maintained for elutriation of the fluidized sand in the slurry, through the vessel and out of the flush outlet.

14 Claims, 8 Drawing Sheets

(56) References Cited

U.S. PATENT DOCUMENTS

| | | | |
|---|---|---|---|
| 2013/0056427 A1* | 3/2013 | Zylla | E21B 43/34 |
| | | | 210/532.1 |
| 2016/0030861 A1* | 2/2016 | Janssen | B01D 21/2472 |
| | | | 210/532.1 |
| 2016/0082377 A1* | 3/2016 | Hemstock | E21B 43/34 |
| | | | 95/258 |
| 2019/0040729 A1* | 2/2019 | Novakovic | E21B 43/34 |

* cited by examiner

PURGING SYSTEM FOR DESANDING VESSELS

FIELD

Embodiments herein relate to systems and methods for the periodic removal of particulates, such as sand, from equipment used for removing sand from fluid streams produced from a well, more particularly for removing collected sand from horizontal, vertical, or spherical desanding equipment.

BACKGROUND

Production from wells, in the oil and gas industry, often contain particulates such as sand. These particulates could be part of the formation from which the hydrocarbon is being produced, introduced particulates from hydraulic fracturing or fluid loss material from drilling mud or fracturing fluids, or from a phase change of produced hydrocarbons caused by changing conditions at the wellbore (asphalt or wax formation). As the particulates are produced at surface the particulates can cause erosion and plugging of production equipment. In a typical startup, after stimulating a well by fracturing, the stimulated well may produce sand until the well has stabilized, often up to several months after production commences.

Erosion of the production equipment is severe enough to cause catastrophic failure. High fluid stream velocities are typical and are even purposefully designed for elutriating particles up the well and to the surface. An erosive failure of this nature can become a serious safety and environmental issue for the well operator. A failure, such as a breach of high pressure piping or equipment, releases uncontrolled high velocity flow of fluid which is hazardous to service personnel. Release to the environment is damaging to the environment resulting in expensive cleanup and loss of production. Repair costs are also high.

In all cases, retention of particulates contaminates surface equipment and the produced fluids, and impairs the normal operation of the oil and gas gathering systems and process facilities.

To protect wellsite production equipment, desanding equipment is often employed upstream of the production equipment for a period of time depending on the extent of sand production. The desanding equipment usually operates at well pressures and the vessels are manufactured as pressure vessels. Such desanding equipment typically collects sand until a reserve storage capacity has been reached, after which the desanding equipment should be emptied of accumulated or collected sand for optimal performance.

Methods to remove sand includes opening of a 'quick closure' to an off-line vessel and personnel manually remove the collected sand. The manual approach is common in lower pressure horizontal gravity or filtration based vessels. Quick closures are typically specified for ANSI/ASME 2500 applications, or up to about 6000 psig at conventional operational temperature ranges. This method requires depressurizing the equipment and opening the closure to gain entry to the vessel. This may expose personnel and the environment to toxic wellbore gases. Other on-the-fly configurations utilize an unloading valve that can be opened while the vessel is under operating pressure. The stored energy in the vessel is used to forcibly evacuate the sand and any associated liquids collected therewith, through the unloading valve. This method is more common in vertical or spherical vessels with a sump. This method exposes the unloading components to the erosive effects of the sand in a high pressure drop situation. Aside from high repair costs associated with this method, personnel and the environment can again be exposed to the discharging wellbore gases with the expelled sand. Further, erosive failure of the unloading process can cause a breach in the valve or associated connective piping at potentially lethal pressures and velocities.

With reference to FIG. 1, as demonstrated in Canadian Patent 2,433,741, issued Feb. 3, 2004 and in Canadian Patent 2,407,554, issued Jun. 20, 2006, both to Applicant, desanding equipment 10 having an elongate, horizontal pressure vessel 11 is disclosed for sand separation having an inlet 24 at one end and an outlet 16 at another, the outlet separated from the inlet by a downcomer flow barrier 14, such as a weir, adjacent the vessel's outlet or exit. Water L and sand S accumulate in an accumulation zone 15 along a belly portion of the vessel 11. Pressure appropriate, a quick closure 52 can be provided at a discharge end 42 of the vessel. Sand S accumulates along a substantial length of the bottom of the elongate vessel. The length of the vessel increases the difficulty of periodic manual removal, typically performed through the quick closure 52 using long-handled scraper rods and the like.

With reference to FIG. 2, in U.S. Pat. No. 8,945,256, issued Feb. 3, 2015, also to Applicant, another sand separator 20 having a sand separator vessel 22 is disclosed, similar to the above, but being tilted at a non-zero inclination angle $\alpha$. Again, entrained liquids L and sand S collect in an accumulation zone 15 in the belly portion of the vessel 22. Even at low angles, the heavy door of quick closures can be difficult to handle. At high inclination angles, approaching the angle of repose of the collected sand S, the door is too heavy to lift, and operation of a quick closure is exacerbated as the sand S will accumulate against the closure. Further, the sand S can self-discharge unpredictably through the closure when opened. In other instances, higher pressure vessels rated to ANSI/ASME 2500 and up, are often precluded from using such fittings.

When manual removal is unacceptable, and pressure restrictions preclude quick closures, manufacturers have turned to permanent fittings and an unloading valve adjacent the bottom of the vessel for pressurized ejection of sand therethrough.

With reference to FIG. 3, in U.S. Pat. No. 9,759,057, issued Sep. 12, 2017, to Dynacorp Fabricators, Inc., a double-tube sand separator 30 is disclosed using both unloading valves and backup manual removal. A first lower horizontal tube 33 is coupled to a second upper horizontal tube 64 by a bridging conduit 62. The sand separator removes particulates in three steps: gravity knock-out in the lower tube 33; a screen across the bridging conduit 62 between the upper tube; and a tubular filter in the upper tube. Sand accumulates over time in an accumulation zone in the belly portion of the lower tube 33. For clean out purposes lower tube 33 includes two unloading ports 82 spaced along its bottom surface and a quick release closure 52 at the closure or discharge end 42. Sand-laden fluid F flows from one end 12 of the lower tube to the discharge end 42, up the bridging conduit 62 and back along the filter of the upper tube 64. To remove sand, the inlet 24 and outlet 16 of the separator 30 are shut in, trapping process pressure therein. Unloading valves are then opened and process pressure blows down sand and water from vessel 33 to a blowdown vessel. Once the vessel has been blown down, the unloading valves are closed and the vessel re-connected to the process. The energy of the trapped process pressure in the vessel is limited and may not fully remove all the accumulated sand. Accordingly, the operator opens the quick closure 52 in any event to manually clean out the vessel with a scraper tool.

With reference to FIG. 4, in U.S. Pat. No. 7,785,400, issued Aug. 31, 2010, to Sand Separators LLC, a spherical sand separator 40 having a spherical vessel 44 is disclosed having lateral inlet 24 and a top vertical outlet 16. Sand accumulates in an accumulation zone at a bottom 142 of the vessel. Sand is periodically removed through a drain port 82 and unloading valve The vessel remains on-line and is an example of the risks of sand removal at process pressures to both equipment and personnel.

As shown in FIGS. 5A and 5B, in U.S. Patent Publication 2016/0082377, published Mar. 24, 2016, to Applicant a vertical sand separator 50 is disclosed having a vertical vessel 55 with an inlet 24 at the top of the vessel and a top or lateral outlet 16 separated by a phase baffle. Sand separated from fluid flowing through the vessel accumulates at a bottom 142 of the vessel. The vessel has a drain port 82 at the bottom surface coupled to a double isolation unloading valve or the like for sand removal. The vessel remains on-line and is an example of the risks of sand removal at process pressures to both equipment and personnel.

The periodic removal of the accumulated particulates from the sand separator is a slow and labor-intensive manual process, or alternatively unloading under pressure is known to be abusive to the equipment and poses a risk to personnel. As such, there has been a desire to improve the ease and speed with which the vessel can be cleaned while also being mindful of its structural integrity.

SUMMARY

Generally, Applicant provides a wash system that effectively removes accumulated sand from desanding vessels without opening the vessel for manual access, and without throttling erosive fluids across valve interfaces at process pressures. Instead, a wash fluid, such as on-site produced fluids, can be introduced to, and flushed through the desander, for fluidizing and elutriating sand with the wash fluid to external collection.

According to a broad aspect of the present disclosure, there is provided a method of cleaning a desanding vessel having a process fluid inlet, a process gas outlet, and a sand accumulation zone, the method comprising: determining that sand has settled in the accumulation zone for removal; isolating the vessel; depressurizing the vessel; introducing flush fluid into the vessel via a flush inlet at or near the process gas outlet, and at a purge rate to fluidize sand in the accumulation zone and form a slurry; collecting the slurry for discharge from the vessel at a flush outlet downstream from the flush inlet; and maintaining the purge rate through the vessel for elutriation of the fluidized sand in the slurry, through the vessel and out of the flush outlet.

In embodiments, the wash system is once through and in others, the fluids can be separated for recycle of the clean wash fluid. A pump can be used for introducing the wash fluid to the vessel. In other embodiments, a blowcase vessel can be used, charged with wash fluid and energized by available process gas for batch introduction of the fluid to the desanding vessel.

BRIEF DESCRIPTION OF THE DRAWINGS

FIGS. 5A and 5B may be collectively referred to herein as FIG. 5;

DETAILED DESCRIPTION

A sand separator or desanding vessel is typically inserted between, or as a replacement for, existing connecting piping coupled to a wellhead and downstream equipment such as production piping, valves, chokes, multiphase gas/liquid separators and other downstream equipment. The use of the desanding vessel may be over a fixed term, only during high sand production, or can be a permanent installation.

Figure 1:
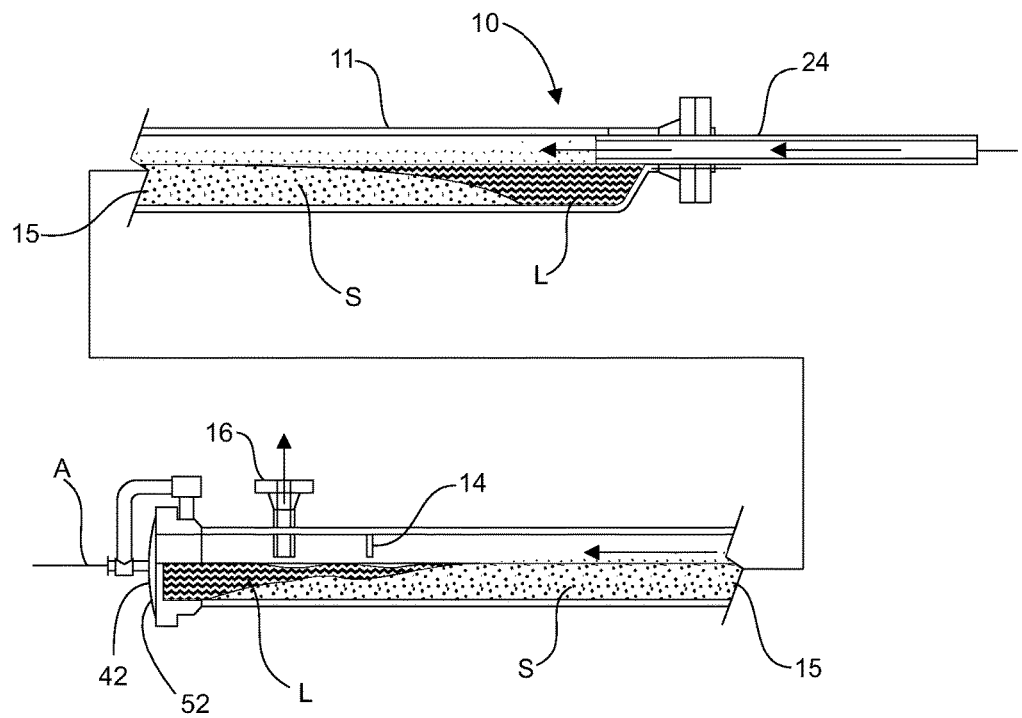
FIG. 1 is a cross-sectional side view of Applicant's own prior art elongated horizontal sand separator, the sand separator incorporating a quick closure for manual removal of collected sand.
Figure 2:
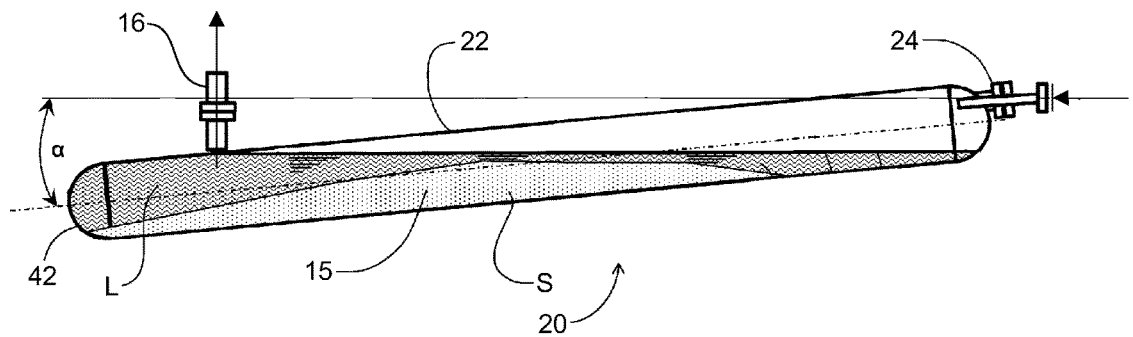
FIG. 2 is a cross-sectional side view of an embodiment of Applicant's prior art tilted sand separator implementing high pressure unloading double-valve arrangement.
Figure 3:
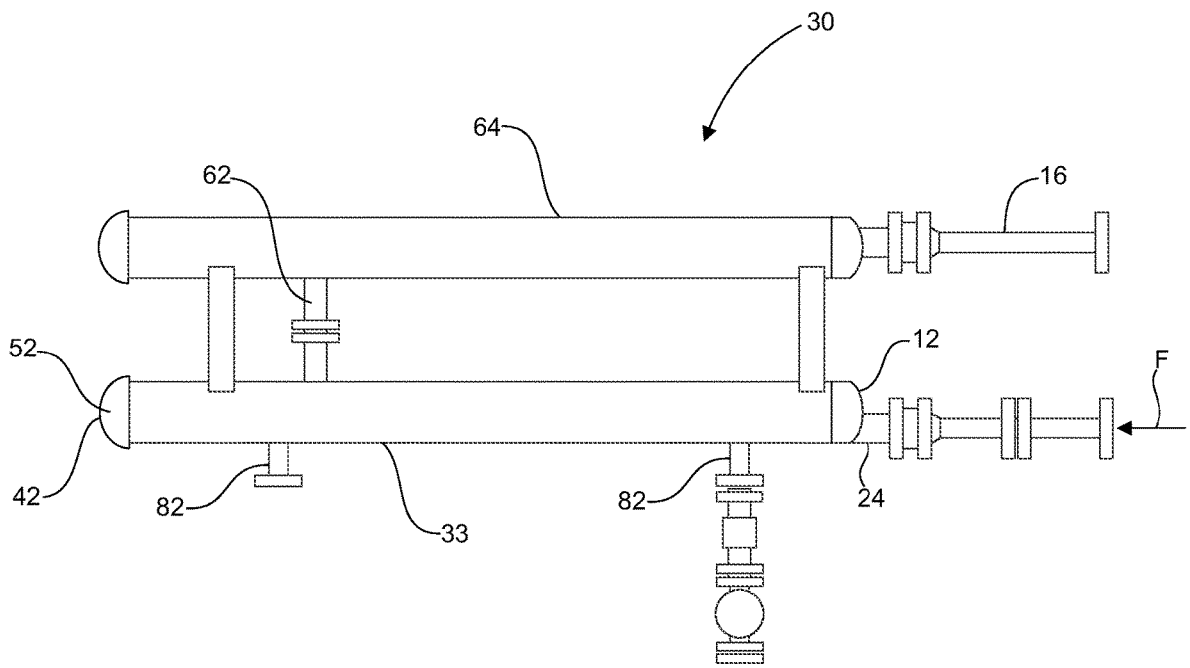
FIG. 3 is cross-sectional side view of a prior art three-stage sand separator having gravity knock-out tube with two drain ports and a quick closure at one end for the removal of collected sand.
Figure 4:
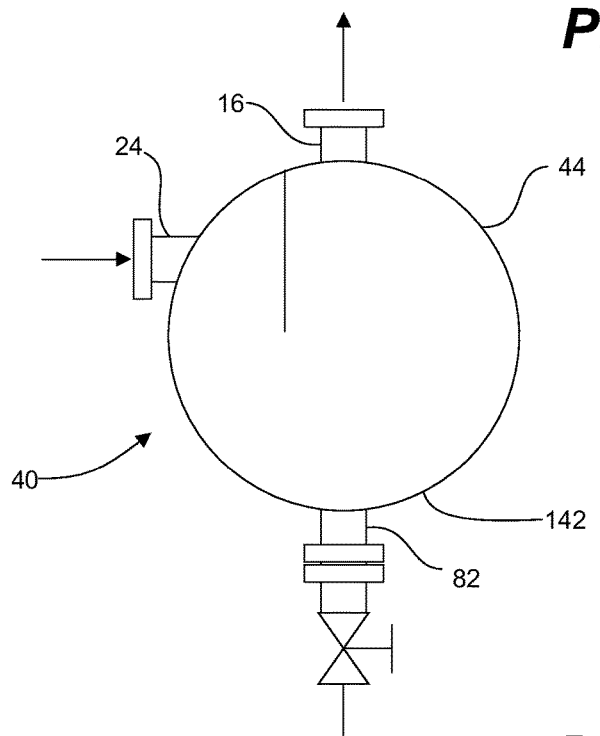
FIG. 4 is cross-sectional side view of a prior art spherical sand separator, the sand separator having a drain port at the bottom for the removal of collected sand.
Figure 5A:
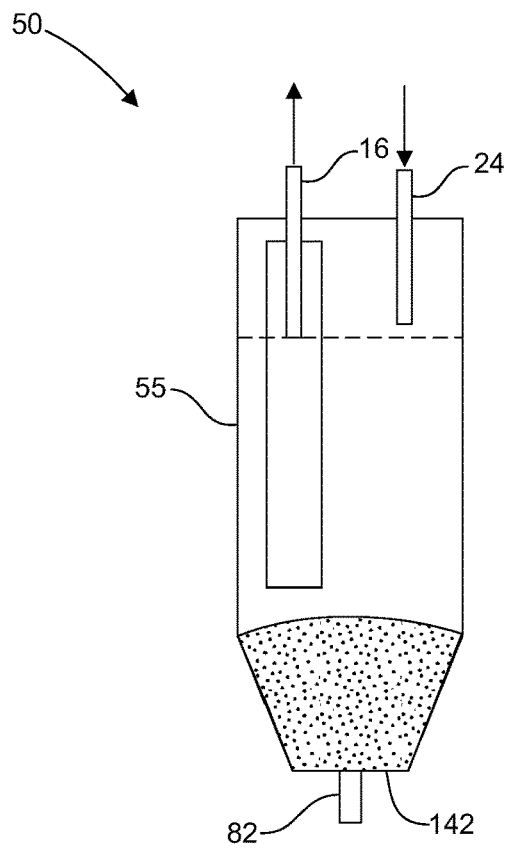
FIG. 5A is a cross-sectional view of a prior art vertical sand separator, the sand separator having a drain port at the bottom for the removal of collected sand.
Figure 5B:
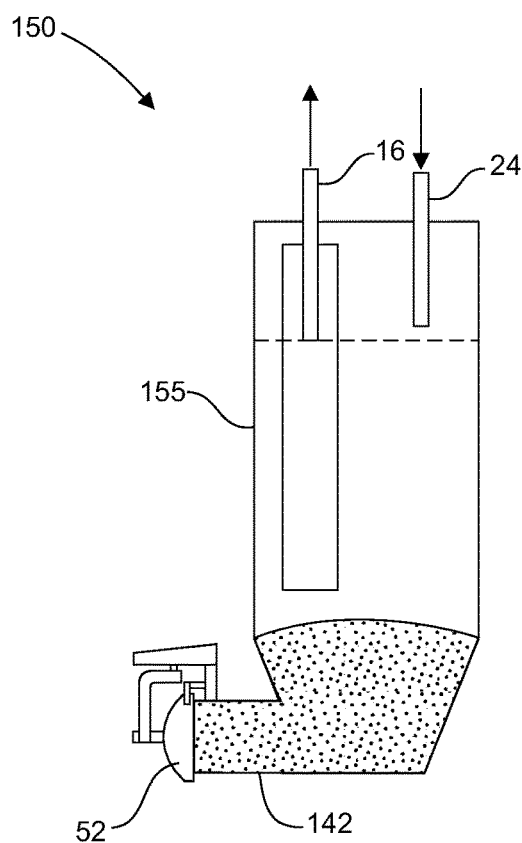
FIG. 5B is a cross-sectional view of another embodiment of the prior art vertical sand separator of FIG. 5A. This embodiment has a quick closure instead of a drain port.

As described above, and as shown in FIGS. 1 and 2, prior art desanding vessels have required laborious manual sand removal. Further, in other desanding vessels, high velocity sand removal using unloading valves, at process pressures, has been known to result in rapid erosion of the components and at great risk to personnel.

Accordingly herein, an equipment-friendly and safe wash system and method is provided for desanding vessels. Generally, after isolating and depressurizing the vessel, a flush fluid is introduced to fluidize sand accumulated therein, the flush fluid flowing at a rate to maintain suspension of the fluidized sand for elutriation of the sand with the flush fluid out of a flush outlet downstream from the flush inlet.

Figures 6A, 8:
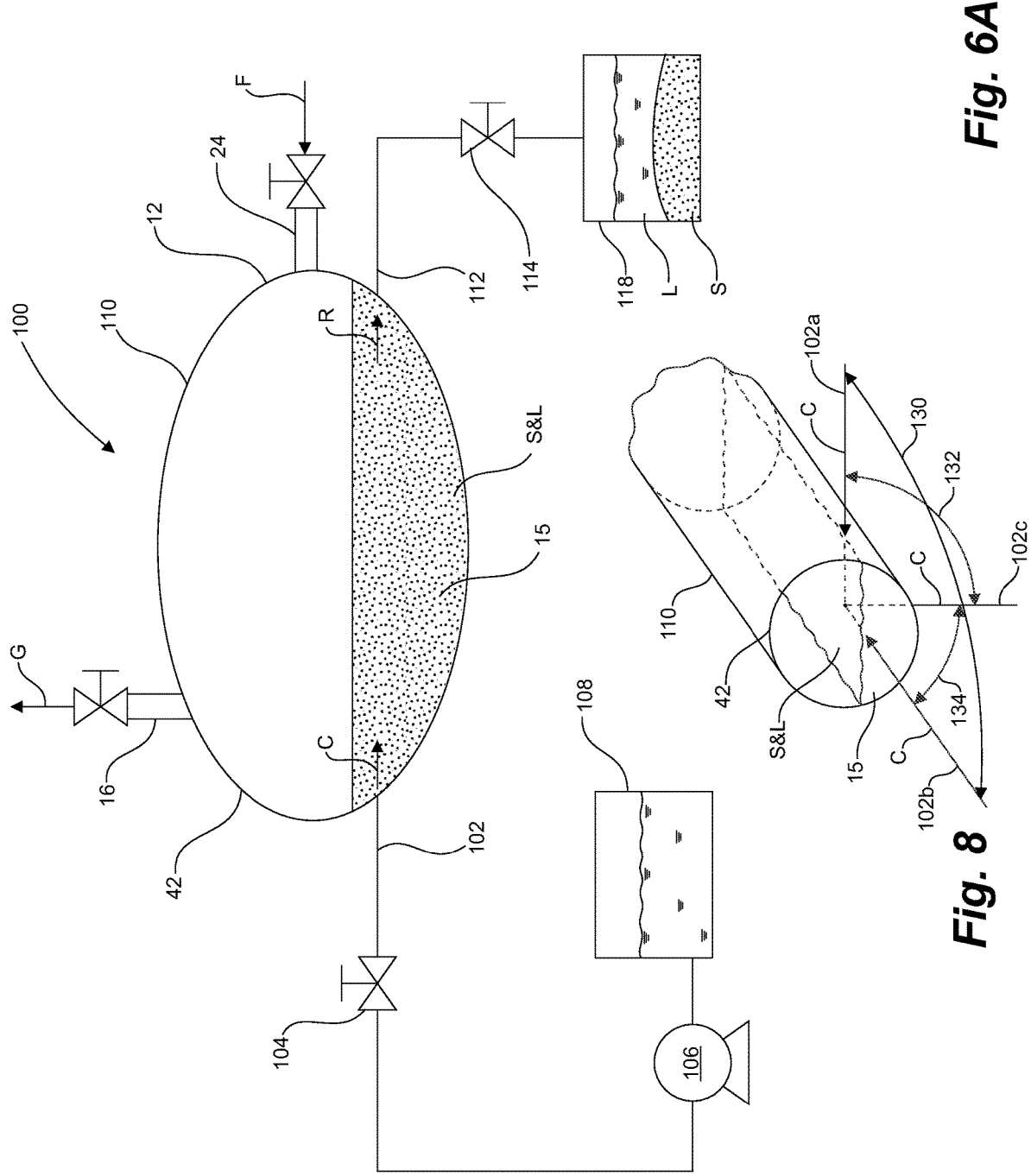
FIG. 6A is a schematic view of a system according to one embodiment of the present disclosure having a once through flush to a collection vessel.
FIG. 8 is a partial and perspective view of the discharge end of the vessel showing various alternate locations for the flush inlet.

Turning to the current embodiments, and with reference to FIG. 6A, a first purging system 100 is described for purging sand from a desanding vessel 110. Note that the components of the system 100 also bear the same reference numerals for like components of the prior art desander vessels of FIGS. 1 through 5B.

The vessel 110 has a sand accumulation zone 15 at a bottom of the vessel 110. During operation, the fluid stream flows F, from the process inlet 24, downstream to the process outlet 16, downstream of the process inlet 24. Liquid and sand from the fluid stream accumulate in the accumulation zone 15, and typically a greater portion of the sand S settles closer to the process outlet 16. The vessel 110 is characterized by a flow or fluid stream F from a process inlet 24 to a process outlet 16. The fluid stream F flows along the vessel 110 from upstream to downstream. The terms upstream and downstream are related to the normal operational process flow and not to a flow of flush fluids C, which are typically flowing in an opposing direction to the process flows. In other words, the flush fluids to purge sand from the vessel flow from the process downstream location to the process upstream location. The process inlet 24 is at one end 12 of the vessel 110, and the process outlet 16 is at or near the other end or discharge end 42.

Herein, the improved vessel further comprises a flush inlet 102, for the introduction of flush fluids C, and a flush outlet 112 for removal of purged slurry R of sand and liquids. The purged slurry R initially comprises sand, S process liquid L, and flush fluid C and shortly thereafter, the slurry R comprises sand and liquid, the majority of which is flush fluid C.

In the illustrated embodiment, flush inlet 102 is positioned at or near the process outlet 16 and directed at the accumulation zone 15. Flush fluid C is introduced through flush inlet 102 and into the inside of vessel 110. A fluid source 108 of flush fluid C is in fluid communication the flush inlet 102. A pump 106 directs a flow rate of flush fluid to the flush inlet 102 at a purging rate. When the vessel is in operation the pump 106 can be isolated from the flush inlet 102 by an inlet block valve 104.

The flush fluid C may be, for example, water, including produced water and/or brine that may be available on site.

The flush inlet 102 is generally positioned to discharge flush fluid C directly into the accumulated sand S at the process discharge end 42. The flush fluid inlet 102 directs the slurry R of sand S and liquids L,C upstream against the usual process flow direction. The flush inlet 102 is typically located at an elevation below that of the process outlet 16 which also corresponds to the elevation of accumulated sand in the accumulation zone 15.

With reference to FIG. 8, in some embodiments, the flush inlet 102 is arranged transverse with, at inlet 102a, or arranged inline to, at inlet 102b, the normal process flow fluids along to the longitudinal axis of the vessel 110. The flush inlet 102 can also be at an acute angle 130a between the orthogonal or in-line arrangement of inlets 102a,102b.

At a transverse arranged inlet 102a, the flush fluid C enters the vessel 110 generally transverse to the usual process flow direction. The introduced flush fluid is thereby required to turn upstream and accordingly can be urged into a turbulent regime for maximum transfer of fluidization energy to the accumulated sand. The flush fluid C fluidizes the sand and places the sand in suspension for forming the slurry R. The purge rate of flush fluid C and removal of the slurry R maintains the sand in suspension for elutriation of the sand from the vessel 110.

Flush inlet 102b, being substantially parallel to the longitudinal axis of the vessel 110, is also directed into the accumulated sand for forming the slurry R. The purge rate for flush fluid C can be tuned depending on the orientation of the flush inlet 102. The flush inlet 102 may also be oriented at other angles relative to the axis of the vessel as the construction methods in the art may permit. FIG. 8 illustrates inlet 102 being orientated somewhere along the angle 130a generally between transverse 102a, and the in-line arrangement 102b, somewhere along the angle 130b generally between transverse 102a horizontal and transverse vertical at inlet 102c, somewhere along the angle 130c generally between in-line 102a horizontal and in-line vertical at inlet 102c, or other non-orthogonal arrangement therebetween. In embodiment, Applicant has determined that transverse-oriented inlets, such as inlets 102a, 102c may result in lower purge rates.

In the illustrated embodiments, flush outlet 112 is positioned at or near the inlet end 12 of the vessel 110. The flush outlet 112 is located towards the process upstream end so as to create a wash path between the flush inlet 102 and the flush outlet 112 that includes a significant portion of the accumulation zone. The flush outlet 112 is in fluid communication with the vessel 110 for receiving the sand-laden slurry R resulting from the flush fluid at purge rates.

An outlet block valve 114 is connected between the flush outlet 112 and a destination for the collected slurry R. When outlet block valve 114 is open, the slurry R is directed from flush outlet 112 to a collection vessel 118, such as a vacuum truck or tank.

The flush outlet 112 is generally positioned at a height below that of the fluid inlet 24 for minimizing elevation gain. In some embodiments, the flush outlet 112 is arranged substantially parallel to the longitudinal axis of the vessel 110 as a least restrictive, lowest pressure drop, removal of the slurry R from the vessel. While other arrangements can remove the slurry, orientations other than in-line with the flow arriving at the flush outlet 112 introduce hydraulic inefficiencies that can cause sand fall out or require correspondingly higher purge rates. Other arrangements could be considered due to practical restriction including vessel location. During normal process operation, flush block valves 104, 114, are closed.

For purging accumulated sand, the vessel 110 is taken off-line by closing process fluid inlet 24 and fluid outlet 16, using isolation valves or other fluid blocking components as known in the art. When the vessel has been isolated from the process, the flow from the wellhead is temporarily interrupted or routed to a parallel desanding vessel. Block valves 104,114 are opened to allow flush fluid C to enter and exit the vessel 110 via flush inlet 102 and the flush outlet 112 respectively. Accumulated sand is fluidized and suspended in the flush fluid C for removal as slurry R. The purging system will be described in more detail hereinbelow.

The purge rate, and resulting velocity of the flush fluid C, as it traverses the vessel 110, is selected to sufficiently fluidize and elutriate the accumulated sand therein in order to facilitate the transport of the resulting slurry R towards and through the flush outlet 112.

It has been found that a flush fluid velocity of about 15 m/min or a purge rate of about 1 $m^3$/min or more is effective in fluidizing and transporting the accumulated sand as a slurry out of the vessel 110. For example, for a 12" (0.3048 m) diameter horizontal desanding vessel, the cross-sectional area is 0.072966 m2, and given a flush fluid flow rate of 1 $m^3$/min, the flush fluid velocity is about 13.7 m/min. For the same desanding vessel, a flush fluid flow rate of 0.5 $m^3$/min equals a flush fluid velocity of about 6.9 m/min. The flush inlet 102 may also comprise a nozzle for localized and higher exit velocities for improved energy transfer to the accumulated sand. Applicant determined that the provision of a distributed inlet, such as a sparger or wash bar did not provide optimal fluidization of the accumulated sand.

The flush inlet 102 and flush outlet 112 each include a connecting piping coupling, such as a connective flange, threaded connection, flathead connection, or forged head, for connection to external piping. For vessels 110 that operate at an internal pressure of 10,000 psi or more, the more easily acquired flathead connections or forged heads are used.

Collection vessel 118 collects and stores the slurry R removed from the vessel 110. As shown in FIG. 6A, the collection vessel 118 is a terminus, the slurry being discharged directly to the storage tank of a transport vehicle such as a vacuum truck. In other embodiments, the collection vessel may comprise one or more stationary tanks that can be emptied at some later scheduled date.

Figure 6B:
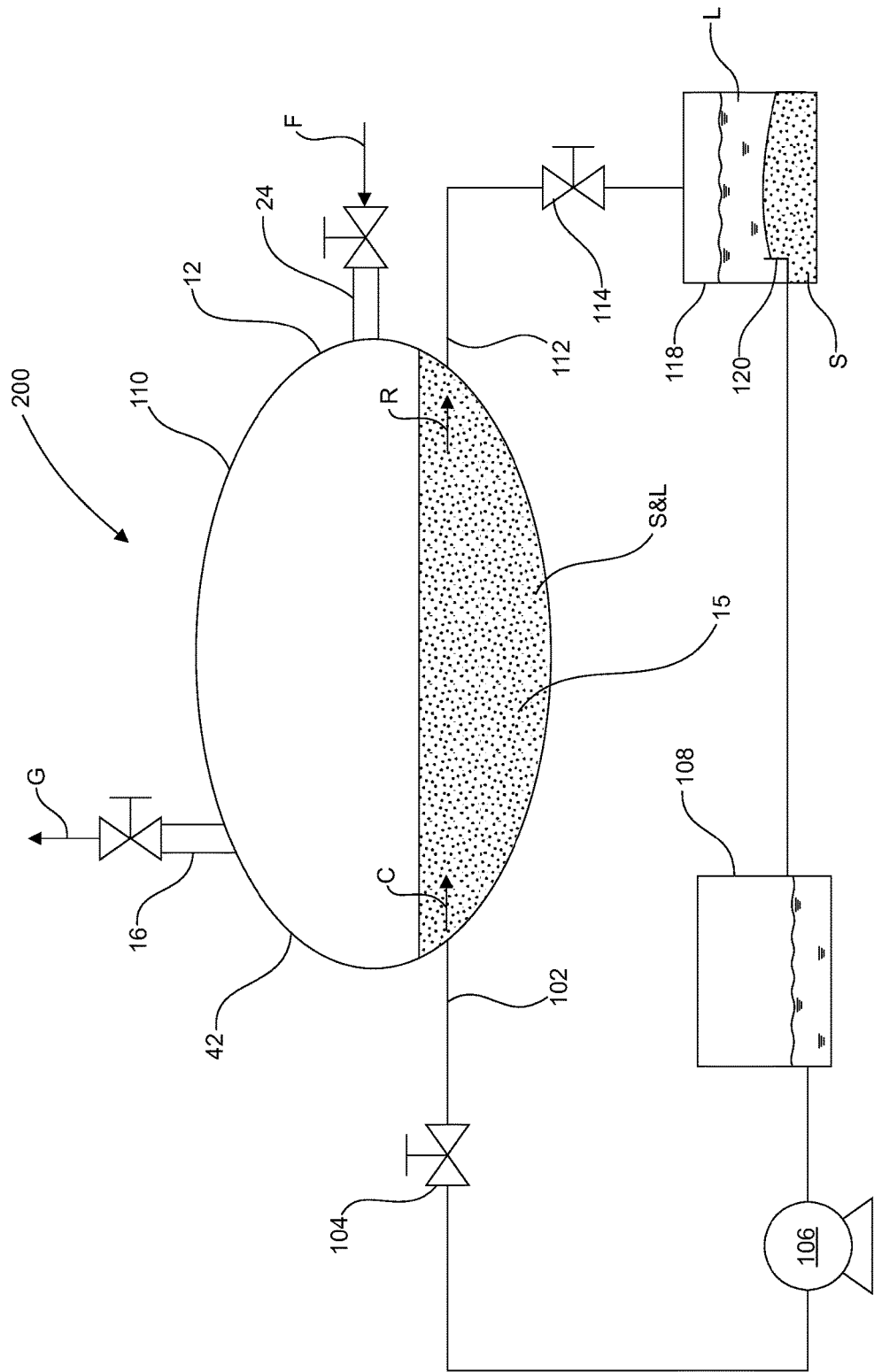
FIG. 6B is a schematic view of a system according to another embodiment of the present disclosure, having a closed loop flush system in which clarified wash fluid from the collection vessel is fluidly connected to the flush fluid source.

With reference to FIG. 6B, in other embodiments, slurry R discharged from vessel 110 of a system 200 is collected in the collection vessel 118, the flush fluid C being decanted or otherwise separated into a clarified flush fluid C for return to the source 108. Decanted fluid C can be collected over a launder 120 or the like. The flush fluid C, returned to a tank source 108 can be pumped off the bottom of tank source 108 back to the flush inlet 102, recirculating the flush fluid F until the amount of accumulated sand in the vessel is reduced to an acceptable fraction, suitable for restarting operations.

Figure 6C:
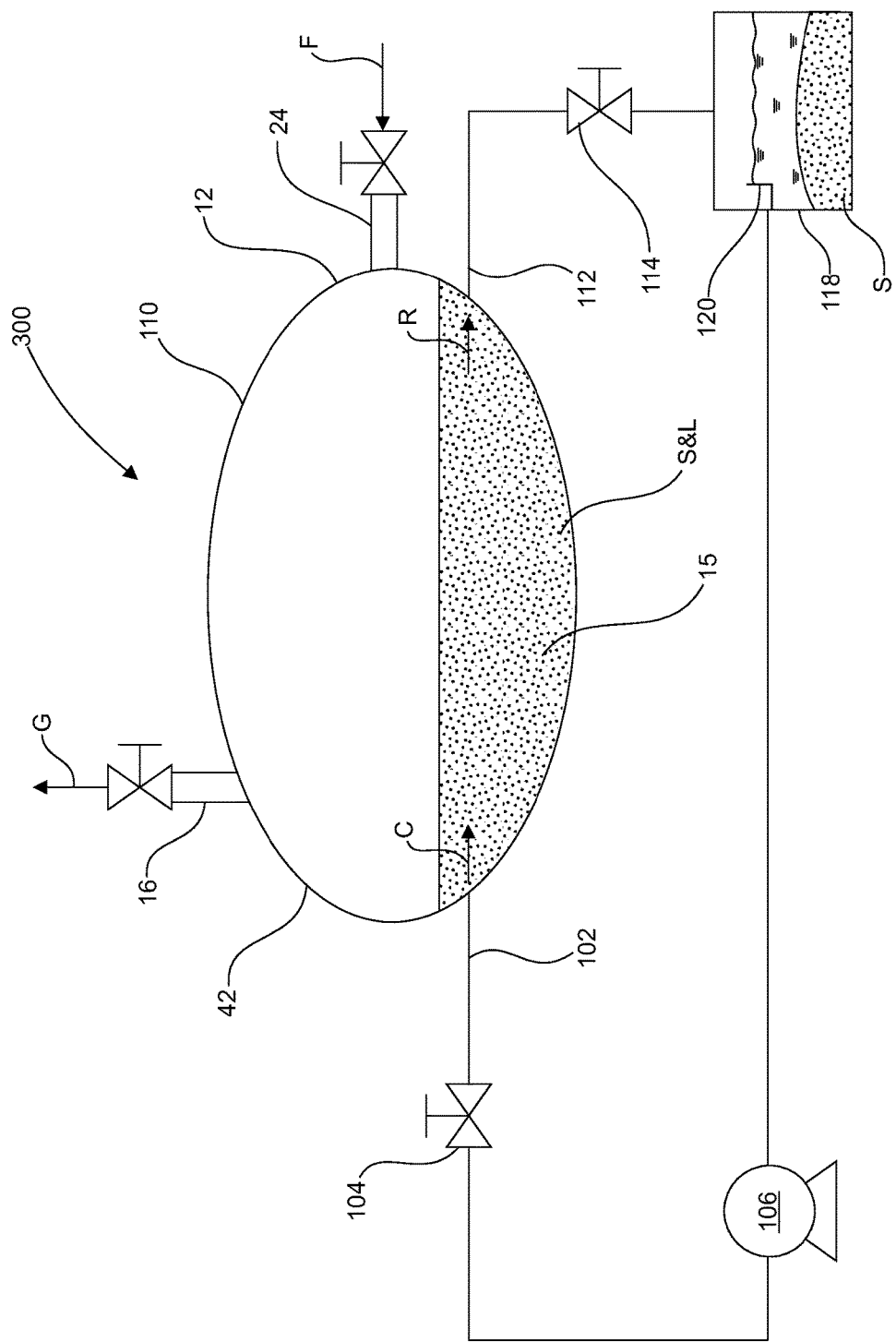
FIG. 6C is a schematic view of a system according to another closed loop embodiment of the present disclosure including fluid recycling, wherein the collection vessel is fluidly connected to the pump.

With reference to FIG. 6C, in an alternative system 300, decanted or otherwise separated flush fluid C from collection vessel 118 can be form the source 108, the pump 106 being directly connected to the launder 120 of the collection vessel 118.

Generally, the flush fluid C is provided at a purge rate to form the slurry R and transport sand S out of the vessel 110. The pressure of the delivery of the flush fluid for the current systems is basically at atmospheric pressure and avoids the high pressure throttling velocities of the prior art that are so damaging to the equipment, especially to the valves. Accordingly, in use, block valves 104,114 are typically operated fully open for minimal pressure drop thereacross. While valves 104,114 can be rated for sand slurry service, the low velocity duty could be managed with conventional block valves. Valves 104,114 may be, for example, ball valves, wear-resistant gates, plug valves, etc. Pump 106 may be selected to provide a volumetric flow rate of about 0.5 m³/min or greater, suitable for delivering suitable purges rates of flush fluid through vessels in the order of 1 foot in diameter. In some embodiments, suitable for a vessel of about 1 to 1.5 feet in diameter, pump 106 is selected to provide a flow rate of about 1 m³/min or greater. Pump 106 may be, for example, a trash pump, loose tolerance centrifugal pump, positive displacement pump such as a triplex pump or blowcase pump.

Figure 6D:
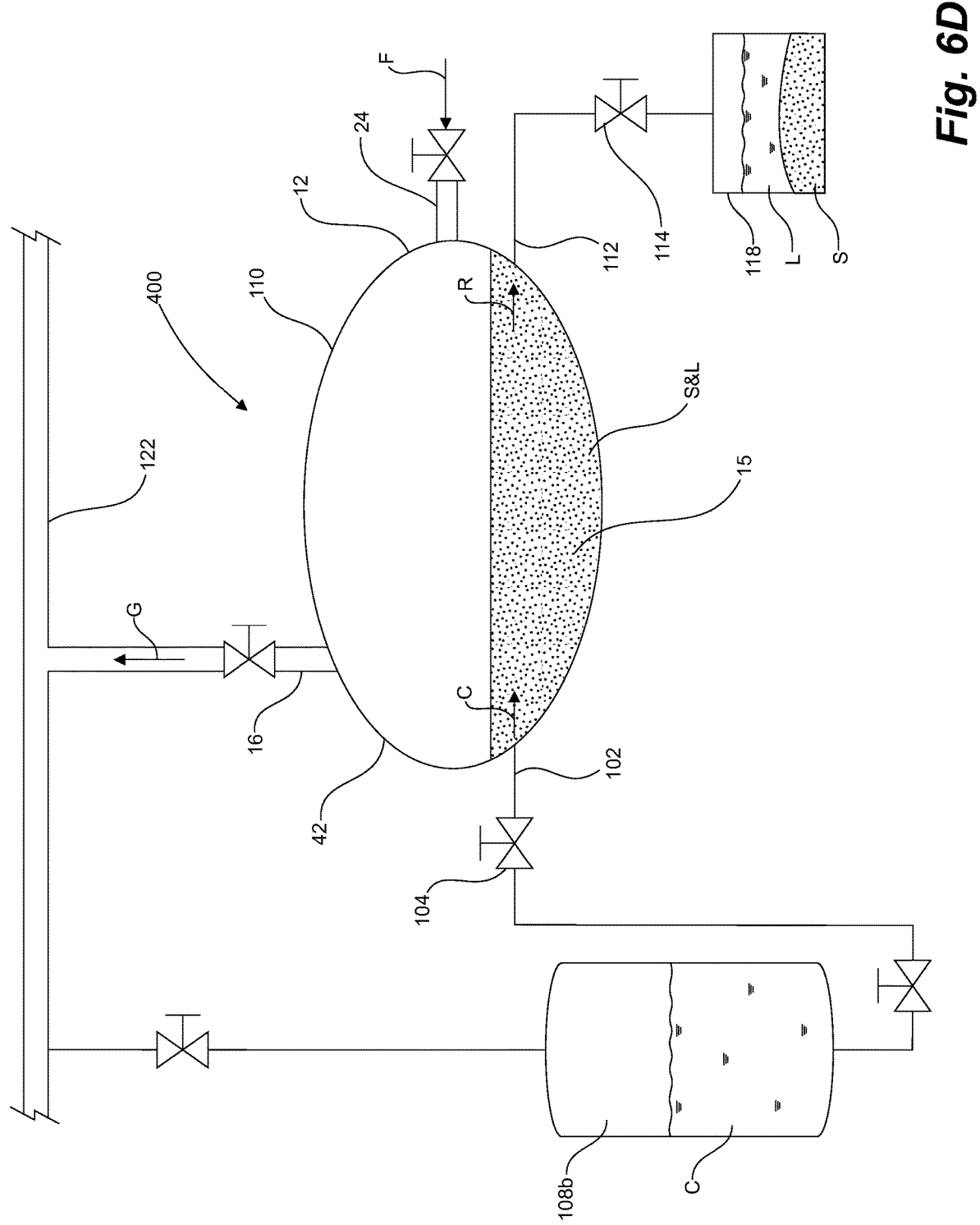
FIG. 6D is a schematic view of a system in which a pump is replaced by a gas-pressurized, fluid-displacement blow-case vessel.

With reference to FIG. 6D, in an example of a blowcase pump, the purging of the desander vessel 110 of a system 400 uses a gas-pressurized, fluid-displacement blowcase vessel as the source 108b. The energy for the flush fluid C can be sourced from a downstream gas destination, typically a pipeline system 122 into which the desanded process gas G is normally directed. The source vessel can be a pressure vessel 108b fluidly connected to the pipeline 122. For purging, the source vessel 108b is isolated from the pipeline, filled with a charge of flush fluid C, typically in a volume suitable for complete flushing of the desanding vessel 110. The source vessel 108b is then pressurized from the high pressure gas and when the wash procedure is started, the flush fluid C in the vessel is displaced from the source vessel 108b by the gas, through the flush block valve 104, and through the flush inlet 102 into the vessel 110 at the purge rate.

Figure 7:
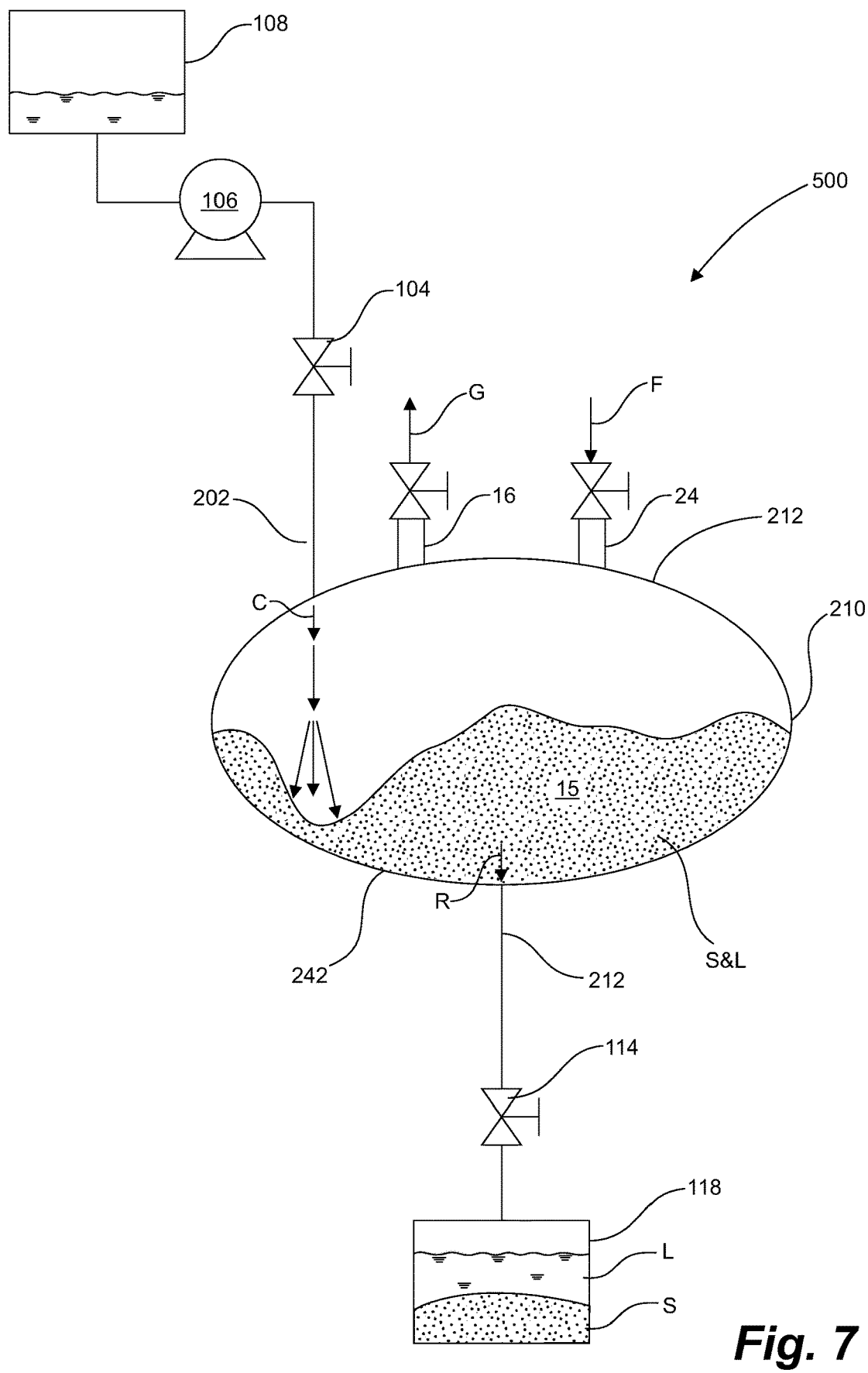
FIG. 7 is a schematic view of a system according to another embodiment of the present disclosure.

FIG. 7 shows a system 500 according to another embodiment. System 500 is generally the same as system 100 of FIG. 6A except for a few differences which are described below. Note that the components of the system 500 also bear the same reference numerals for like components of the prior art desander vessels of FIGS. 1 through 5B and the systems of FIGS. 6A to 6D. System 500 comprises a top-down type desanding vessel 210, such as the above-described prior art vessels 44,55,155 with respect to FIGS. 4, 5A, and 5B, respectively.

Again, vessel 210 is already fit with piping including a process inlet 24 and a process outlet 16 at or near the top end 212 of the vessel. Particulates S and liquids L settle towards bottom in an accumulation zone 15 at the lower end 242 of the vessel. Herein the improved vessel 210 further comprises a flush inlet 202 and a drain port or flush outlet 212. In some embodiments, the flush inlet 202 and/or outlet 212 could be incorporated into the existing piping, such as the process inlet 24 and/or an existing drain port, respectively.

In the illustrated embodiment, flush inlet 202 is again positioned near the fluid outlet 16 at or near the top end 212 of the vessel 210, for the introduction of flush fluids C and a flush outlet 212 for removal of purged slurry R of sand and liquids. The flush inlet 202 is in fluid communication with the flush fluid source 108 and pump 106 as described above with respect to system 100 in FIG. 6A. Flush inlet 212 again may be arranged at various orientations relative to the longitudinal axis of the vessel 210 as described above with reference to FIG. 8.

The flush outlet 212 is at or near the lower end 242 of the vessel 210, and in fluid communication with the vessel 210 for receiving the sand-laden slurry R resulting from the flush fluid at purge rates. Flush outlet 212 can be selectively opened and shut by an outlet block valve 114 connected thereto, as described above with respect to system 100 of FIG. 6A. Flush outlet 212 again may be arranged at various orientations relative to the longitudinal axis of the vessel 210 as described above.

During normal process operation, flush block valves 104, 114, are closed. For purging accumulated sand, the vessel 210 is taken off-line by closing process fluid inlet 24 and fluid outlet 16, and accumulated sand is fluidized and removed as described above with respect to system 100 and as described below in more detail.

Again, system 500 has a collection vessel 118 for collecting and storing the slurry R drained out from flush outlet 212. Again, the collection vessel 118 may be one or more storage tanks and the flush fluid C in the slurry R may be separated therefrom for reuse as described above with respect to FIGS. 6A to 6C.

The vessel 110,210 of systems 100,200,300,400,500 can be cleaned out periodically as follows: (i) desanding vessel 110,210 is shut in by closing off the process outlet 16 and process inlet 24 from the other wellhead equipment, thereby stopping well fluids from entering the vessel 110,210. Process outlet 16 and process inlet 24 may be closed off by, for example, valves (not shown) or other means known to those in the art. Without ceasing the production of well fluids, the incoming well fluids may be redirected to other wellhead equipment (which may include another sand separator) while bypassing desanding vessel 110,210; (ii) After vessel 110,210 is shut in, it is depressurized; and (iii) Once depressurized, valves 104,114 are opened and pump 106 is turned on.

Pump 106 draws flush fluid from the source 108 and/or collection vessel 118, if applicable, and pumps the flush fluid into the vessel 110,210 via the flush inlet 102,202. It can be appreciated that the velocity and flow rate of the flush fluid may be selected to optimize mobilization and/or elutriation of the accumulated particulates in the vessel 110,210. The vessel's contents, including any accumulated particulates therein, exit the vessel via flush outlet 112,212. The contents that are flushed out are collected in collection vessel 118. The injection of flush fluid into vessel 110,210 and the draining of the vessel's contents may occur simultaneously or sequentially.

In some embodiments, valves 104,114 and pump 106 are controlled manually by an operator or automatically with a timer. In other embodiments, the cleaning out of vessel 110,210 may be initiated and performed automatically. For example, systems 100,200,300,400,500 may include an ultrasonic sand detector which automatically initiates the shutting in and depressurization of vessel 110,210 upon detecting a preselected level of particulate accumulation in the vessel. The system 100,200,300,400,500 may be further equipped with pressure sensors to detect the pressure inside vessel 110,210 such that once the vessel 110,210 is depressurized, valves 104,114 open and pump 106 turn on automatically to remove particulates liquids from vessel 110, 210.

The systems and methods disclosed herein allow a desanding vessel to be cleaned out in minutes, as opposed to hours when done manually, thereby reducing the total downtime in the operating life cycle of the desanding equipment. As those skilled in the art can appreciate, the systems and methods of the present disclosure may be applied to various types of desanding vessels, including those not specifically described herein.

The desanding systems and methods disclosed herein eliminate the need to access the desanding vessel by opening a quick closure, thereby providing a safer and more efficient cleanout process. The present disclosure provides a desanding system having cleanout equipment or a desanding vessel that is sealingly connectable to cleanout equipment that allows the desanding vessel to be cleaned without the need to open up the vessel to the atmosphere and manually remove particulates from the opened vessel. Keeping the desanding vessel closed off from the atmosphere eliminates any unnecessary emissions and exposure of the desander's contents to the operator.

What is claimed is:

1. A method of cleaning a desanding vessel having a process fluid inlet, a process gas outlet and a sand accumulation zone, the method comprising:
   determining that sand has settled in the accumulation zone for removal;
   isolating the vessel;
   depressurizing the vessel;
   introducing flush fluid into the vessel via a flush inlet at or near the process gas outlet, and at a purge rate to fluidize sand in the accumulation zone and form a slurry;
   collecting the slurry for discharge from the vessel at a flush outlet downstream from the flush inlet; and
   maintaining the purge rate through the vessel for elutriation of the fluidized sand in the slurry, through the vessel and out of the flush outlet.

2. The method of claim 1 wherein the flush inlet is positioned in the accumulation zone.

3. The method of claim 1 wherein the flush inlet is positioned at an upper end of the desanding vessel.

4. The method of claim 1 wherein the flush inlet is positioned at or near a first end of the desanding vessel and the flush outlet is positioned at or near a second end of the desanding vessel, opposite the first end.

5. The method of claim 1 wherein the flush outlet is positioned in the accumulation zone.

6. The method of claim 1 further comprising transporting the slurry from the vessel at a purge rate of 1 m3/min or greater.

7. The method of claim 1 wherein introducing flush fluid comprises pumping the flush fluid at a velocity of about 15 m/min or more.

8. The method of claim 1 wherein the vessel has a cross-sectional area, and the slurry is transported through at a velocity of about 15 m/min or greater.

9. The method of claim 1 wherein introducing comprises connecting the flush inlet to a pump, the pump being in communication with a flush fluid source.

10. The method of claim 1 wherein collecting comprises receiving by a collection vessel the flush fluid and particulates from the flush outlet.

11. The method of claim 10 wherein the collection vessel comprises a vacuum truck or one or more tanks.

12. The method of claim 1, further comprising introducing some of the collected flush fluid back into the desanding vessel via the flush inlet.

13. The method of claim 1, wherein introducing the flush fluid into the vessel comprises pressurizing a charge of flush fluid in a blowcase vessel, and introducing the pressurized flush fluid to the flush inlet.

14. The method of claim 13, wherein during operation of the desanding vessel, discharging process gas out of the process gas outlet to a pipeline; and for purging the vessel, pressurizing the charge of flush fluid in the blowcase vessel from the pipeline.

* * * * *